(12) United States Patent
Yang et al.

(10) Patent No.: US 9,848,302 B2
(45) Date of Patent: Dec. 19, 2017

(54) SELF-LEARNING LOCATOR FOR MOBILE DEVICE

(71) Applicant: Intel Corporation, Santa Clara, CA (US)

(72) Inventors: Lei Yang, Hillsboro, OR (US); Jared B. Counts, St. Peters, MO (US); Xue Yang, Arcadia, CA (US); Shao-Wen Yang, Hillsboro, OR (US); Arvind Kumar, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/087,161

(22) Filed: Mar. 31, 2016

(65) Prior Publication Data

US 2017/0289764 A1    Oct. 5, 2017

(51) Int. Cl.
*H04W 24/00* (2009.01)
*H04W 4/02* (2009.01)

(52) U.S. Cl.
CPC ........... *H04W 4/025* (2013.01); *H04W 4/023* (2013.01); *H04W 4/027* (2013.01); *H04W 4/028* (2013.01)

(58) Field of Classification Search
CPC ..... H04W 4/025; H04W 4/023; H04W 4/027; H04W 4/028; H04W 84/12; H04W 24/08; H04W 4/02; H04W 4/021; G01S 5/0018; G01S 5/0045; G01S 5/0252; G06F 17/243; G06F 17/241; G06F 17/30253; G06F 17/30265; G06Q 30/02; G06Q 30/0207

USPC ......... 455/456.1, 435, 435.1, 423, 450, 460; 705/14.1

See application file for complete search history.

(56) References Cited

U.S. PATENT DOCUMENTS

| | | | |
|---|---|---|---|
| 2009/0042557 A1* | 2/2009 | Vardi | H04W 72/02 455/422.1 |
| 2012/0215548 A1* | 8/2012 | Chen | G06Q 10/00 705/1.1 |
| 2012/0316964 A1* | 12/2012 | Roumeliotis | H04W 4/021 705/14.58 |

(Continued)

FOREIGN PATENT DOCUMENTS

EP        2845025 A1 *  3/2015  ........... G01S 5/0252

OTHER PUBLICATIONS

"International Application Serial No. PCT/US2017/019098, International Search Report dated May 24, 2017", 3 pgs.

(Continued)

*Primary Examiner* — Mahendra Patel
(74) *Attorney, Agent, or Firm* — Schwegman Lundberg & Woessner, P.A.

(57) ABSTRACT

A system for locating a mobile device includes an input that accesses a plurality of scans of wireless network access signaling, where the scans indicate received signal measurement results. A similarity measure module executes comparisons between the data of different scans in order to assess the similarity between those scans. The comparisons produce multi-dimensional comparison results. A dimension reduction module reduces dimensionality of the multi-dimensional comparison results to produce a dimension-reduced set of comparison results. A clustering module identifies groupings of similar scans based on the dimension-reduced set of comparison results.

25 Claims, 7 Drawing Sheets

(56) References Cited

U.S. PATENT DOCUMENTS

| | | | |
|---|---|---|---|
| 2013/0079039 A1* | 3/2013 | Heikkilae | H04W 4/025 455/456.6 |
| 2014/0018095 A1* | 1/2014 | Parvizi | H04W 4/043 455/456.1 |
| 2014/0057651 A1* | 2/2014 | Lin | H04W 64/003 455/456.1 |
| 2014/0171098 A1* | 6/2014 | Marti | G01S 5/0252 455/456.1 |
| 2014/0370844 A1 | 12/2014 | Lara et al. | |
| 2014/0378159 A1 | 12/2014 | Dolbakian et al. | |
| 2015/0154621 A1* | 6/2015 | Taylor | G06Q 30/0207 705/14.1 |
| 2015/0189528 A1* | 7/2015 | Carbajal | H04W 24/08 370/252 |
| 2016/0014570 A1* | 1/2016 | Wuoti | G06Q 30/0207 455/456.3 |
| 2016/0042252 A1* | 2/2016 | Sawhney | G06K 9/6224 382/190 |

OTHER PUBLICATIONS

"International Application Serial No. PCT/US2017/019098, Written Opinion dated May 24, 2017", 6 pgs.

Jiang, Yifei, et al., "ARIEL: Automatic Wi-Fi based Room Fingerprinting for Indoor Localization", UbiComp '12, (2012), 441-450.

Xu, Yaqian, et al., "DCCLA—Automatic Indoor Localization Using Unsupervised Wi-Fi Fingerprinting", (Oct. 23, 2013), 15 pgs.

* cited by examiner

SELF-LEARNING LOCATOR FOR MOBILE DEVICE

TECHNICAL FIELD

Embodiments described herein generally relate to information processing and mobile computing and, more particularly, to determining a location of a mobile device within a complex environment where traditional location services may be impracticable.

BACKGROUND

With the recent explosion of smart mobile devices and location based services, reliable and accurate location sensing has become increasingly important for the operation of a variety of applications, and is now virtually expected by users to be available. However, there are oftentimes circumstances that adversely affect the functionality of location services. For instance, indoors, particularly in commercial office buildings, signal reception from Global Positioning System (GPS) satellites is generally not possible in the absence of line-of-sight signal reception. In addition, there tend to be numerous obstructions in indoor environments that prevent terrestrial location systems from working effectively.

For indoor spaces where GPS does not work, obtaining physical coordinates of locations typically require an end-to-end system that consists of location anchor points (access points) and/or location servers. The deployment of a physical indoor location system is not trivial. In general, mobile devices (e.g., laptops, tablets, wearable devices) without substantial back-end location system support are not capable of obtaining physical locations by themselves.

A practical solution is needed for mobile devices to obtain location information in challenging environments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Aspects of the embodiments are directed to a self-learning system, components thereof, and methods of operation thereof, that can directly learn the semantic locations without deriving any physical locations. Some embodiments advantageously may not require any prior knowledge or pre-training process in order to learn the semantic locations. Embodiments described herein enable a light-weight semantic localization solution that can run on client devices including laptops, tablets, wearable devices, etc. without depending on back-end location systems, though in other embodiments portions of the system may be server-based.

Figure 1:
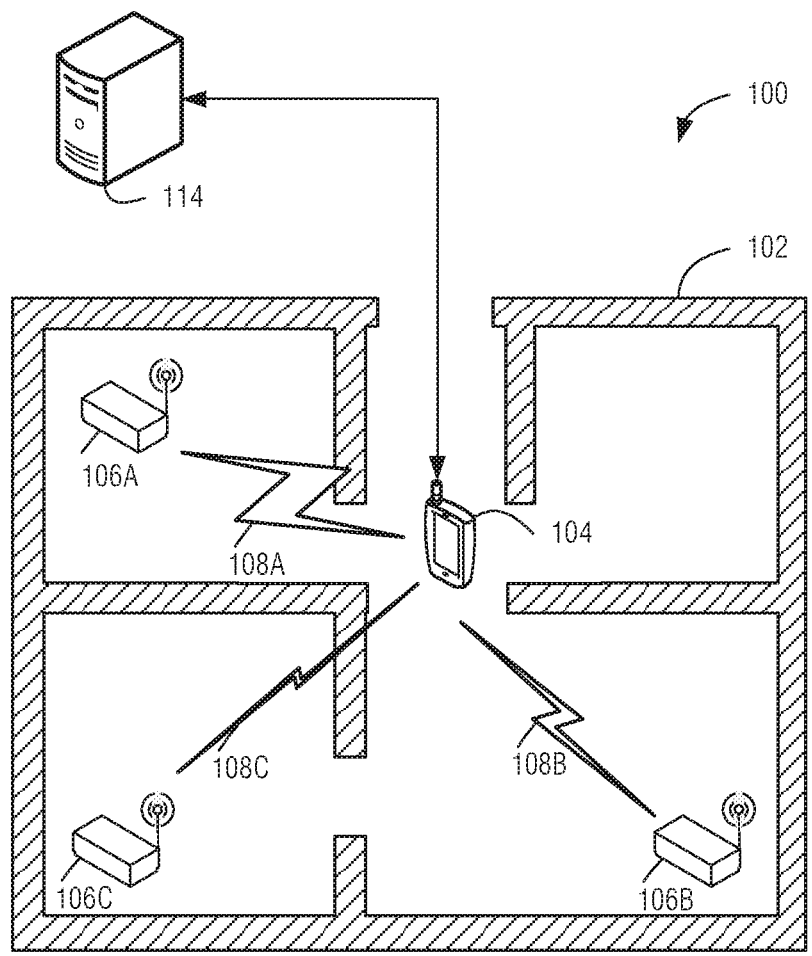
FIG. 1 is a high-level diagram illustrating an example arrangement of a system for obtaining location information by a mobile device according to an embodiment.

FIG. 1 is a high-level schematic diagram illustrating example components of a system for locating a mobile device according to an embodiment. According to an embodiment, a locator system utilizes wireless network access signaling collected in the background during the user's day-to-day activities, and automatically groups them into virtual rooms in a network access signal space. The virtual rooms may be directly mapped to physical rooms via a simple user-interactive annotation process. Aspects of the embodiments recognize that each physical room "observes" different network access signals due to different proximity to wireless network access points, different room layouts, walls, structural members, furniture, room dividers and various other radio signal attenuations, reflections, or signal scattering. In a dense wireless network environment, separate rooms may be distinguished based on the observed wireless network signal characteristics.

As illustrated, system 100 works in environment 102, which is laid out as a set of rooms separated by walls. Mobile device 104 is situated within signal-reception proximity to three wireless network access points, 106A, 106B, and 106C. Given its relative location to each wireless network access point, 106, mobile device 104 receives signaling at various signal strengths. For example, as illustrated, mobile device 104 receives a strong signal 108A from network access point 106A, a medium-strength signal 108B from network access point 106B, which is at a greater distance from mobile device 104, and a low-strength signal 108C from network access point 106C, which is located on the other side of an obstruction in the form of a wall, as shown.

In an embodiment, mobile device 104 collects scans of the network access point signaling. The scans may record the signal strength using such measurements as received signal strength indication (RSSI), reference signal receive power (RSRP), reference signal receive quality (RSRQ), or the like. Each scan may be recorded as a vector of individual network access point measurements corresponding to the different network access points from which signals are detectable.

According to an embodiment, mobile device 104, over time, and after gathering a series of scans, discovers certain patterns of network access point signaling, and forms clusters of scans that may be associated with different physical locations in environment 102. In a related embodiment, remote server 114 may perform some portion of the pattern-recognition processing. It will be understood that, according to various embodiments, system 100 may be one physical machine, or may be distributed among multiple physical machines, such as by role or function, or by process thread in the case of a cloud computing distributed model. In various embodiments, aspects of the embodiments may be configured to run in virtual machines that in turn are executed on one or more physical machines. Accordingly, features described herein may be realized by a variety of different suitable machine implementations.

In one aspect of the embodiments, an unsupervised clustering process in the wireless network signal space automatically groups network access point signal scans into room-level virtual clusters. The solution may be made robust to radio RSSI measurement and environment noise, with the inclusion of certain features for filtering data de-noising techniques to improve the robustness of the process. In related embodiments, a streaming data processing algorithm reduce the computational load and storage requirements to support real-time processing and learning on mobile devices.

Figure 2:
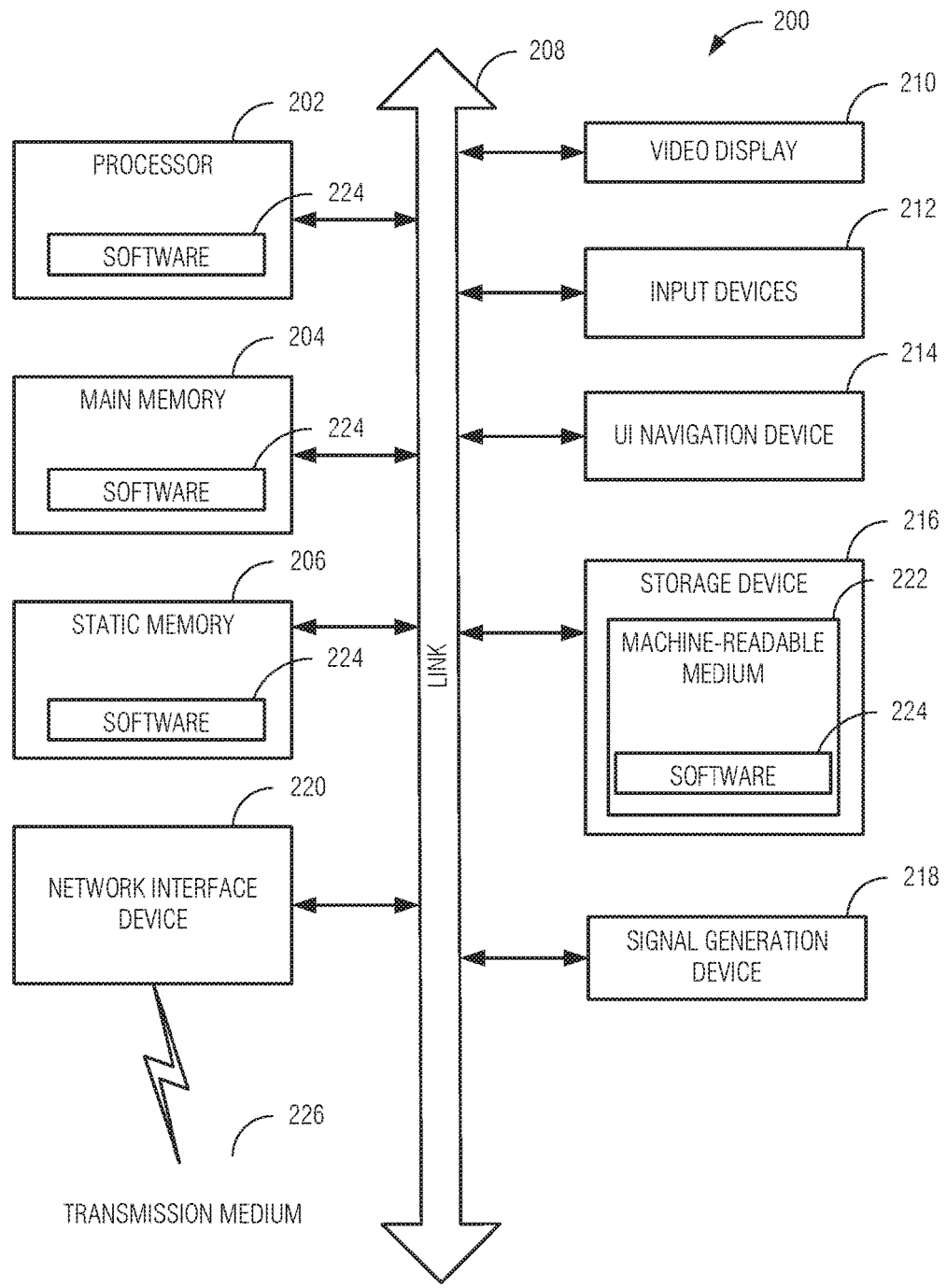
FIG. 2 is a block diagram illustrating an exemplary system architecture of a processor-based computing device according to an embodiment.

Mobile device 104 may be one of a variety of device types. For instance, it may be a multi-functional device such as a smartphone, tablet, laptop, smartwatch, wearable form factor (e.g., smart glasses or a device embedded in garment), etc. The wireless network access points 106 may be WiFi access points that operate in conformance with one or more of the IEEE 802.11 family of standards. Other types of wireless networks are contemplated as well, such as personal-area networks (PANs) like Bluetooth Low Energy network, a home-area network according to standards promulgated by the Zigbee Alliance, a long-term evolution (LTE) network, e.g., using macrocells, microcells, picocells, femtocells, etc., according to standards promulgated by the Third Generation Partnership Project (3GPP). In a related embodiment, mobile device 104 may have the capability of detecting signals from multiple types of networks simultaneously FIG. 2 is a block diagram illustrating a computing platform in the example form of a general-purpose machine. In certain embodiments, programming of the computing platform 200 according to one or more particular algorithms produces a special-purpose machine upon execution of that programming, to implement embodiments of the invention. In a networked deployment, the computing platform 200 may operate in the capacity of either a server or a client machine in server-client network environments, or it may act as a peer machine in peer-to-peer (or distributed) network environments. Computing platform 200, or some portions thereof, may represent an example architecture of computing platform 106 or external computing platform 114 according to one type of embodiment.

Example computing platform 200 includes at least one processor 202 (e.g., a central processing unit (CPU), a graphics processing unit (GPU) or both, processor cores, compute nodes, etc.), a main memory 204 and a static memory 206, which communicate with each other via a link 208 (e.g., bus). The computing platform 200 may further include a video display unit 210, input devices 212 (e.g., a keyboard, data capture device, microphone), and a user interface (UI) navigation device 214 (e.g., mouse, touchscreen). The computing platform 200 may additionally include a storage device 216 (e.g., a drive unit), a signal generation device 218 (e.g., a speaker), and a network interface device (NID) 220.

The storage device 216 includes a machine-readable medium 222 on which is stored one or more sets of data structures and instructions 224 (e.g., software) embodying or utilized by any one or more of the methodologies or functions described herein. The instructions 224 may also reside, completely or at least partially, within the main memory 204, static memory 206, and/or within the processor 202 during execution thereof by the computing platform 200, with the main memory 204, static memory 206, and the processor 202 also constituting machine-readable media.

While the machine-readable medium 222 is illustrated in an example embodiment to be a single medium, the term "machine-readable medium" may include a single medium or multiple media (e.g., a centralized or distributed database, and/or associated caches and servers) that store the one or more instructions 224. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

NID 220 according to various embodiments may take any suitable form factor. In one such embodiment, NID 220 is in the form of a network interface card (NIC) that interfaces with processor 202 via link 208. In one example, link 208 includes a PCI Express (PCIe) bus, including a slot into which the NIC form-factor may removably engage. In another embodiment, NID 220 is a network interface circuit laid out on a motherboard together with local link circuitry, processor interface circuitry, other input/output circuitry, memory circuitry, storage device and peripheral controller circuitry, and the like. In another embodiment, NID 220 is a peripheral that interfaces with link 208 via a peripheral input/output port such as a universal serial bus (USB) port. NID 220 transmits and receives data over transmission medium 226, which may be wired or wireless (e.g., radio frequency, infra-red or visible light spectra, etc.), fiber optics, or the like.

Figure 3:
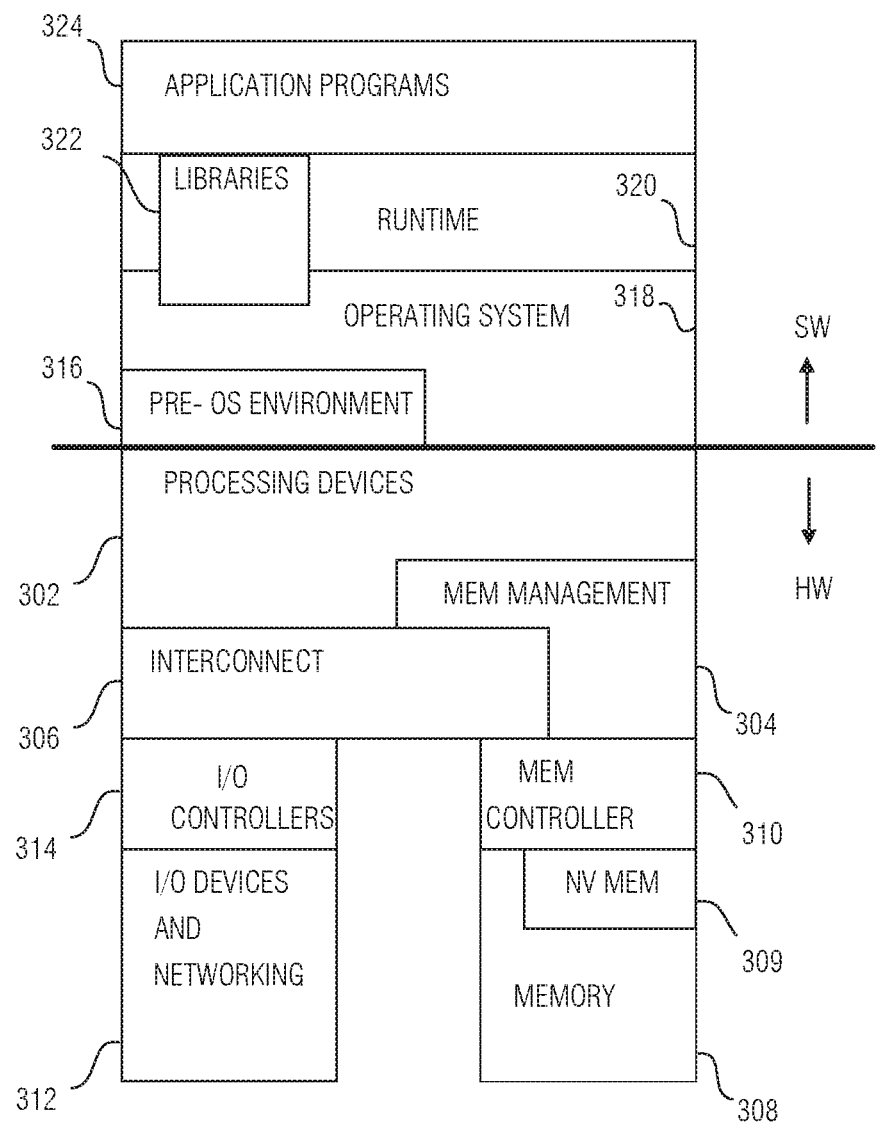
FIG. 3 is a diagram illustrating an exemplary hardware and software architecture of a computing device such as the one depicted in FIG. 2, in which various interfaces between hardware components and software components are shown.

FIG. 3 is a diagram illustrating an exemplary hardware and software architecture of a computing device such as the one depicted in FIG. 2, in which various interfaces between hardware components and software components are shown. As indicated by HW, hardware components are represented below the divider line, whereas software components denoted by SW reside above the divider line. On the hardware side, processing devices 302 (which may include one or more microprocessors, digital signal processors, etc., each having one or more processor cores, are interfaced with memory management device 304 and system interconnect 306. Memory management device 304 provides mappings between virtual memory used by processes being executed, and the physical memory. Memory management device 304 may be an integral part of a central processing unit which also includes the processing devices 302.

Interconnect 306 includes a backplane such as memory, data, and control lines, as well as the interface with input/output devices, e.g., PCI, USB, etc. Memory 308 (e.g., dynamic random access memory—DRAM) and non-volatile memory 309 such as flash memory (e.g., electrically-erasable read-only memory—EEPROM, NAND Flash, NOR Flash, etc.) are interfaced with memory management device 304 and interconnect 306 via memory controller 310. This architecture may support direct memory access (DMA) by peripherals in one type of embodiment. I/O devices, including video and audio adapters, non-volatile storage, external peripheral links such as USB, Bluetooth, etc., as well as network interface devices such as those communicating via Wi-Fi or LTE-family interfaces, are collectively represented as I/O devices and networking 312, which interface with interconnect 306 via corresponding I/O controllers 314.

On the software side, a pre-operating system (pre-OS) environment 316, which is executed at initial system start-up and is responsible for initiating the boot-up of the operating system. One traditional example of pre-OS environment 316 is a system basic input/output system (BIOS). In present-day systems, a unified extensible firmware interface (UEFI) is implemented. Pre-OS environment 316, is responsible for initiating the launching of the operating system, but also provides an execution environment for embedded applications according to certain aspects of the invention.

Operating system (OS) 318 provides a kernel that controls the hardware devices, manages memory access for programs in memory, coordinates tasks and facilitates multi-tasking, organizes data to be stored, assigns memory space and other resources, loads program binary code into memory, initiates execution of the application program which then interacts with the user and with hardware devices, and detects and responds to various defined interrupts. Also, operating system 318 provides device drivers, and a variety of common services such as those that facilitate interfacing with peripherals and networking, that provide abstraction for application programs so that the applications do not need to be responsible for handling the details of such common operations. Operating system 318 additionally provides a graphical user interface (GUI) module that facilitates interaction with the user via peripheral devices such as a monitor, keyboard, mouse, microphone, video camera, touchscreen, and the like.

Runtime system 320 implements portions of an execution model, including such operations as putting parameters onto the stack before a function call, the behavior of disk input/output (I/O), and parallel execution-related behaviors. Runtime system 320 may also perform support services such as type checking, debugging, or code generation and optimization.

Libraries 322 include collections of program functions that provide further abstraction for application programs. These include shared libraries, dynamic linked libraries (DLLs), for example. Libraries 322 may be integral to the operating system 318, runtime system 320, or may be added-on features, or even remotely-hosted. Libraries 322 define an application program interface (API) through which a variety of function calls may be made by application programs 324 to invoke the services provided by the operating system 318. Application programs 324 are those programs that perform useful tasks for users, beyond the tasks performed by lower-level system programs that coordinate the basis operability of the computing device itself.

Figure 4:
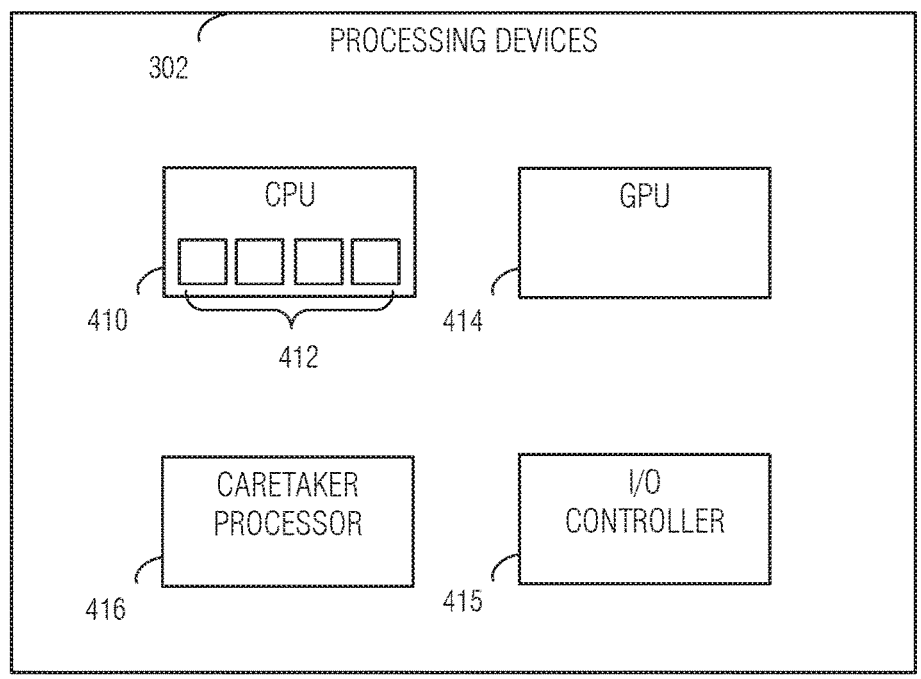
FIG. 4 is a block diagram illustrating examples of processing devices that may be implemented on a computing platform, such as the computing platform described with reference to FIGS. 2-3, according to an embodiment.

FIG. 4 is a block diagram illustrating processing devices 302 according to one type of embodiment. One, or a combination, of these devices may constitute processor 202 in one type of embodiment. CPU 410 may contain one or more processing cores 412, each of which has one or more arithmetic logic units (ALU), instruction fetch unit, instruction decode unit, control unit, registers, data stack pointer, program counter, and other essential components according to the particular architecture of the processor. As an illustrative example, CPU 410 may be an x86-type of processor. Processing devices 302 may also include a graphics processing unit (GPU) 414. In these embodiments, GPU 414 may be a specialized co-processor that offloads certain computationally-intensive operations, particularly those associated with graphics rendering, from CPU 410. Notably, CPU 410 and GPU 414 generally work collaboratively, sharing access to memory resources, I/O channels, etc.

Processing devices 302 may also include caretaker processor 416 in one type of embodiment. Caretaker processor 416 generally does not participate in the processing work to carry out software code as CPU 410 and GPU 414 do. In one type of embodiment, caretaker processor 416 does not share memory space with CPU 410 and GPU 414, and is therefore not arranged to execute operating system or application programs. Instead, caretaker processor 416 may execute dedicated firmware that supports the technical workings of CPU 410, GPU 414, and other components of the computing platform. In one type of embodiment, caretaker processor is implemented as a microcontroller device, which may be physically present on the same integrated circuit die as CPU 410, or may be present on a distinct integrated circuit die. Caretaker processor 416 may also include a dedicated set of I/O facilities to enable it to communicate with external entities. In one type of embodiment, caretaker processor 416 is implemented using a manageability engine (ME) or platform security processor (PSP). Input/output (I/O) controller 415 coordinates information flow between the various processing devices 410, 414, 416, as well as with external circuitry, such as a system interconnect.

Examples, as described herein, may include, or may operate on, logic or a number of components, engines, or modules, which for the sake of consistency are termed modules, although it will be understood that these terms may be used interchangeably. Modules may be hardware, software, or firmware communicatively coupled to one or more processors in order to carry out the operations described herein. Being ultimately implemented using hardware, modules are tangible entities capable of performing specified operations and may be configured or arranged in a certain manner In an example, circuits may be arranged (e.g., internally or with respect to external entities such as other circuits) in a specified manner as a module. In an example, the whole or part of one or more computing platforms (e.g., a standalone, client or server computing platform) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time.

Figure 5:
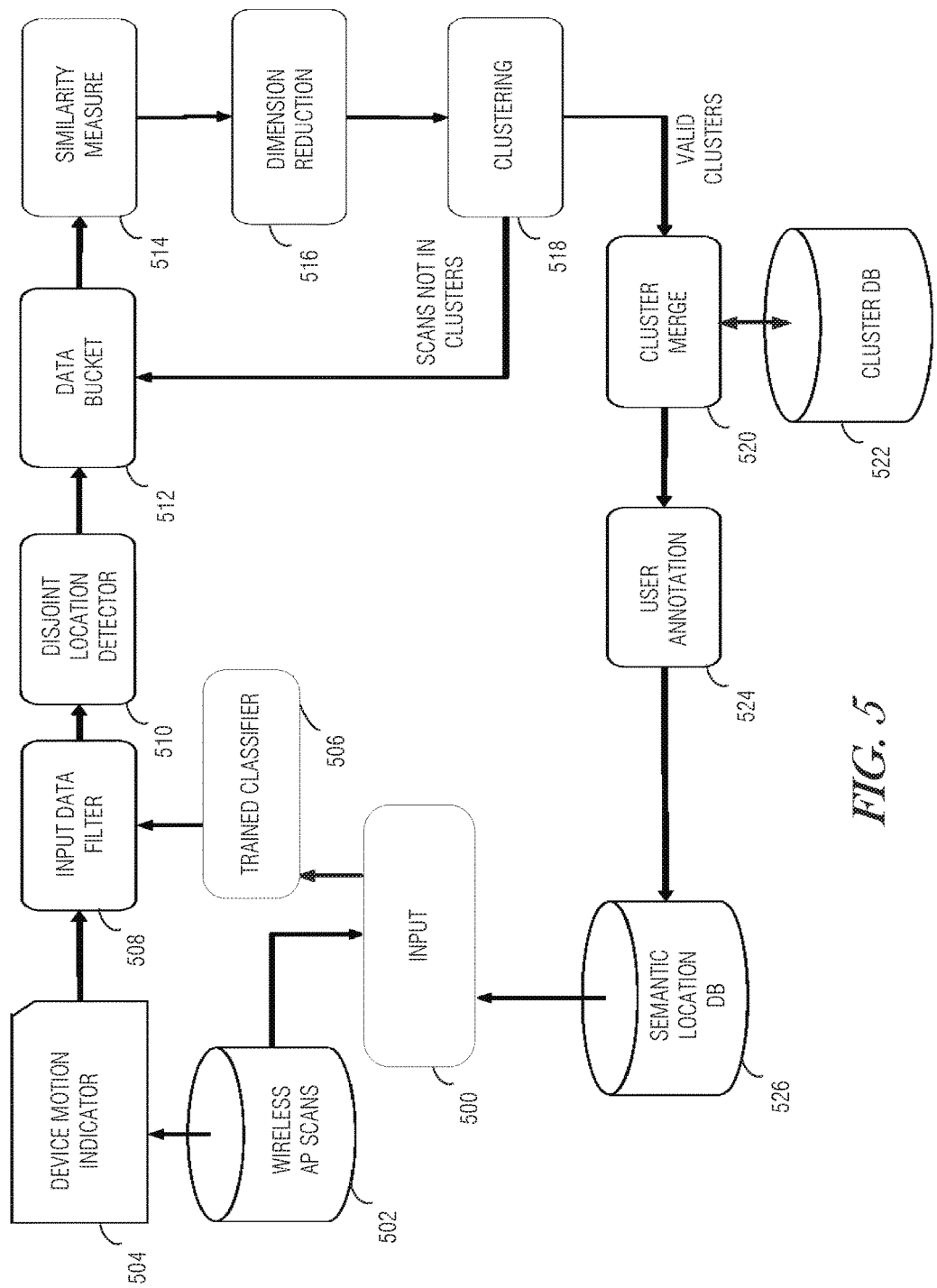
FIG. 5 is a block diagram illustrating a system that may be implemented on a computing platform, for providing a self-learning locator according to an embodiment.

FIG. 5 is a block diagram illustrating various modules that may be implemented on a computing platform to carry out the locator system according to one type of embodiment. The embodiment depicted in FIG. 5 includes input module 500 that is constructed, programmed, or otherwise configured, to access scans 502 of network access point signals. Scans 502 may be stored in a database, as depicted, according to an embodiment. Each new scan may be represented by a vector $W_i=[s_1, \ldots, s_N]$, where $s_j$ represents the signal strength of $AP_j$ (j=1 ... N) for the ith scan $W_i$. In response to each new scan, input module 500 passes the scan data for further processing by other modules that make up the mobile device location system.

In an embodiment, input module 500 passes the newly-accessed scan to trained classifier 506. Trained classifier 506 is programmed, or otherwise configured, to check if the newly-accessed scan is similar to a known scan, which has already been classified to a specific location. If the scan has been previously classified, it may be discarded from further processing, and the location associated with the classification may be assigned to the mobile device. Otherwise, if the scan is not classified, then it is advanced to further filtering modules.

Input data filter module 508 is constructed, programmed, or otherwise configured, to test if a circumstance surrounding the scan renders the scan moot, duplicative, or otherwise not suitable for further processing as an indicator of location of the mobile device. In one such embodiment, input data filter module 508 reads device motion indicator 504. Device motion indicator 504 may be based on gathered or captured data by an accelerometer, a pattern of coarse network-based positioning changes over time, a pattern of coarse GPS positioning changes over time, hand-overs in a cellular network, etc. In an example, if the device motion indicator indicates that the mobile device is in motion, the scan data may be disregarded since motion is indicative of the device transitioning from one room to another. In a related example, if a given number of new network access point signal scans have been collected since the device has been stationary, the system may reject or stop subsequent network access point scans to avoid collecting redundant data.

Disjoint location detector module 510 is constructed, programmed, or otherwise configured, to recognize a circumstance where the mobile device is in an entirely different location. This may be accomplished, for example, when a scan produces an entirely different set of network access points. This situation may represent the mobile device having been taken to a different location. In response to recognition of such an event, the system may, going forward, treat scans at the new or different location in isolation from scans performed at other locations.

Data bucket module 512 is constructed, programmed, or otherwise configured, to implement a window-based approach to segmenting network access point signal scans. This feature may be applied where the number of scans accumulated at one place tends to be large, such as hundreds of scans made in a home setting in a single day. The complexity of an unsupervised clustering algorithm increases quickly with the number of input scans. Accordingly, in an embodiment, a window-based data bucket approach is employed to keep the processing dataset small enough for effective clustering. For instance, the data bucket size may be 50 scans, and the batch data processing (building distance matrix, dimension reduction and clustering) starts once the data bucket is filled with 50 scans.

Similarity measure module 514 is constructed, programmed, or otherwise configured, to execute comparisons between the data of different scans in order to assess the similarity between those scans. In one type of embodiment, similarity measure module 514 builds a multi-dimensional data set representing the comparison results. For example, a comparison matrix may be built from different computations between pairs of scan-data vectors. In a related embodiment, a Euclidian distance may be computed on each difference element of the comparison matrix to produce an indicator of similarity. In other related embodiments, other comparisons are contemplated, such as correlation coefficient, and rank-order score, for instance.

The result set produced by similarity measure module 514 may be quite large in size and dimensionality, thereby substantially burdening the computational efficiency of the locator system. In an embodiment that addresses this concern, dimension reduction module 516 is constructed, programmed, or otherwise configured, to reduce the dimensionality of the raw network access point signal data to a 2-dimensional representation. In an example, a multidimensional scaling (MDS) technique is used. MDS is an umbrella term for a class of algorithms which reduce high dimensional data to lower dimensions, while maintaining certain properties (e.g., distances, variation, and structure). In one embodiment, a Principal Component Analysis (PCA)-based metric MDS algorithm is applied to a distance matrix obtained from the previous block, to map the raw scans into points on a 2D space. Although the resulting 2D space does not necessary reflect actually physical room topology, it retains the relative similarity properties between the network access point signal scans. Advantageously, contrary to conventional clustering approaches that operate directly on high-dimensional data (e.g., raw scans), the PCA-first approach according to some embodiments may provide certain benefits. For instance, the data dimension is reduced for more efficient clustering. In addition, the measurement noise from the Principal Component Analysis (PCA) may be reduced, Clustering module 518 is constructed, programmed, or otherwise configured, to run a standard DBSCAN (Density-based spatial clustering of applications with noise) algorithm to group the scans in the 2D virtual space into clusters. In one example realization, a DBSCAN algorithm is employed because it may not require the number of clusters as input. In other embodiments, other clustering algorithms may also be applied, such as, for example, K-means clustering with clustering number estimation.

In a related embodiment, for the clustering results from DBSCAN, a minimum cluster size threshold K is defined. (E.g. K=10). If there are less than K scans in a cluster, the cluster may be labeled as not statistically significant. The corresponding scans may be passed back into the data bucket module 512 for the next round of processing. The remainder of the scans that have been successfully clustered (i.e., resulting in valid clusters) are advanced to the next cluster merge module 520.

Cluster merge module 520 is constructed, programmed, or otherwise configured, to work together with the data bucket module 512 to enable streamed data processing. Since the incoming scan data set is divided into virtual buckets, there are usually duplicated virtual clusters discovered from different data buckets. In cluster merging, each learned cluster from the current data bucket is compared against each of the existing virtual clusters learned from previous data buckets to check for duplication. An inter-cluster distance $D_i$ may be utilized as the average Euclidean distance between any two pairs of scans from the current cluster to an existing cluster i. In an embodiment, if the inter-cluster distance $D_i$ is less than a predefined threshold, the two clusters are deemed to correspond to the same room; accordingly, the two clusters may be merged and saved as such in cluster database 522.

User annotation module 524 is constructed, programmed, or otherwise configured, to provide a user interface (UI) through which where user may label each discovered cluster with a semantic location name, or reject it. For example, in an embodiment, an application may prompt the user to give a name for a virtual room, and the user may decide to name it "Bedroom," or ignore it. After the user annotation, the labeled cluster is added to semantic location database 526 for future automated location detection.

Figure 6A:
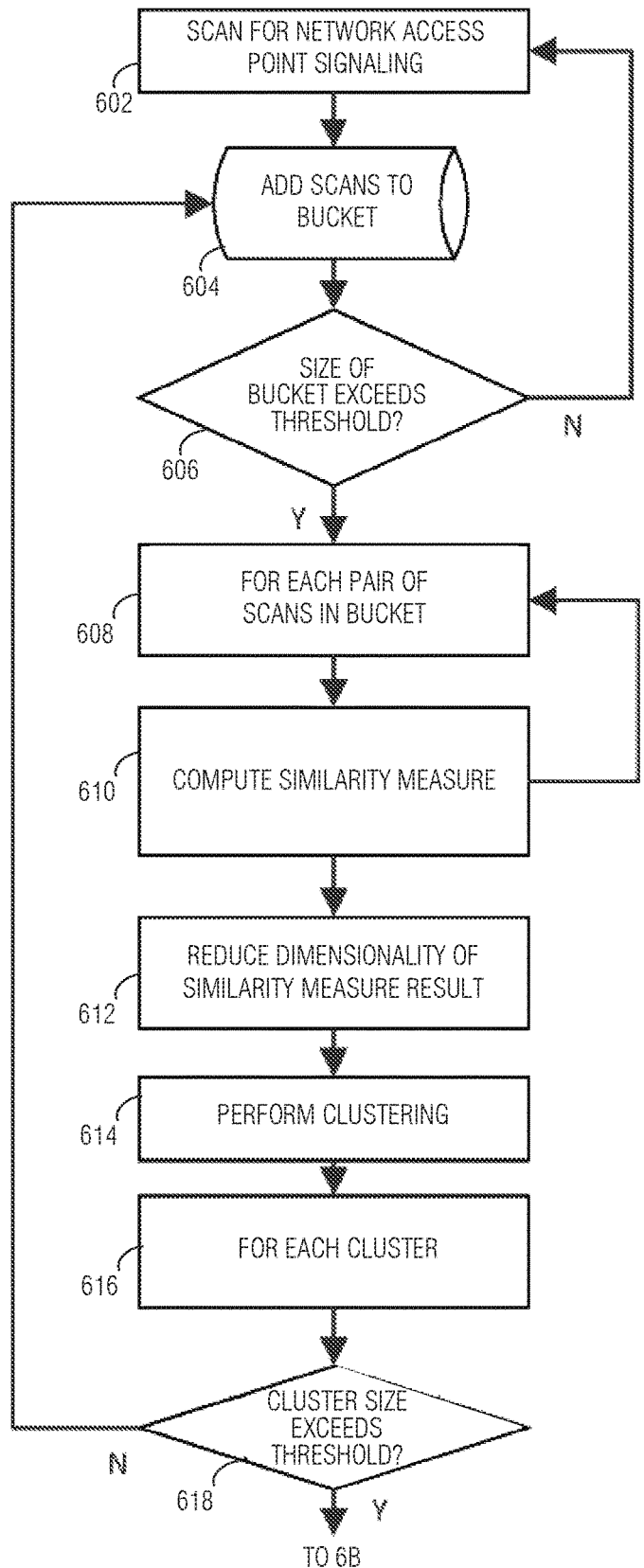
FIGS. 6A-6B is a process flow diagram illustrating an example operation of a locator system according to an embodiment.
Figure 6B:
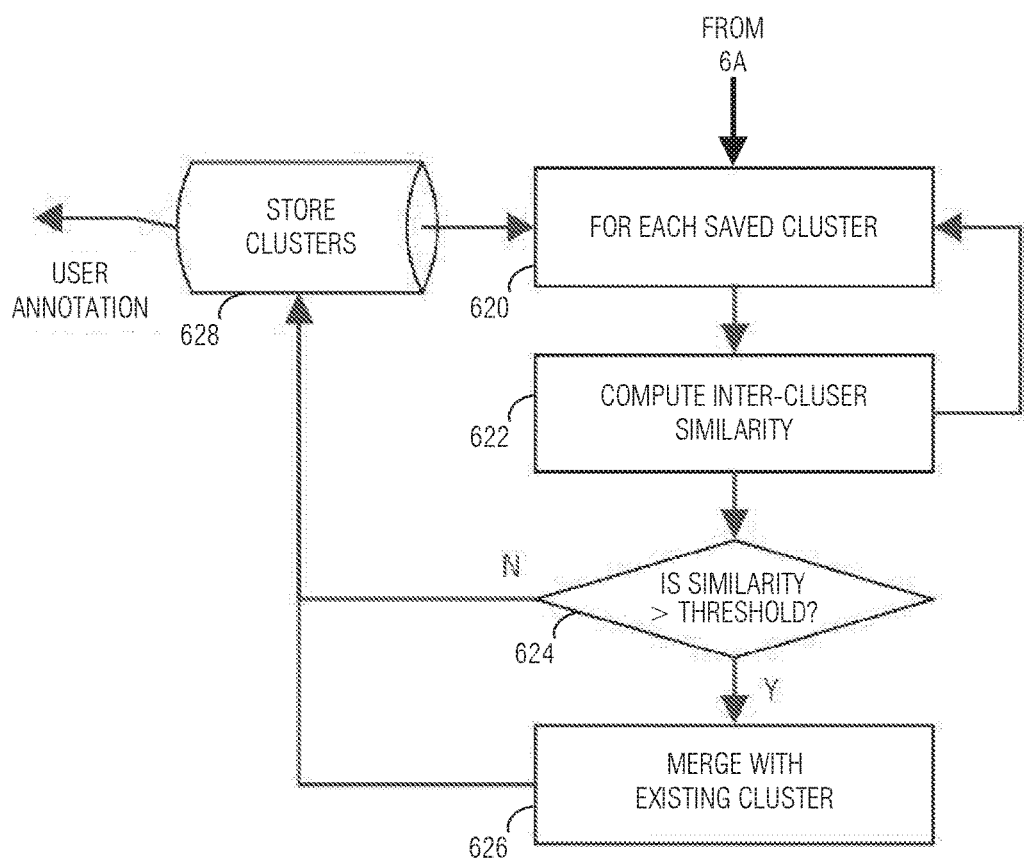

FIGS. 6A-6B are flow diagrams illustrating a process that a device locator system may perform according to certain aspects of the invention. The system is realized entirely in a mobile device according to one type of embodiment. In another type of embodiment, the system is distributed among multiple physical devices, at least one of which is a mobile device.

It is important to note that the example process is a richly-featured embodiment that may be realized as described; in addition, portions of the process may be implemented while others are optional, or excluded, in various embodiments. The following Additional Notes and Examples section details various combinations, without limitation, that are contemplated. It should also be noted that in various embodiments, certain process operations may be performed in a different ordering than depicted, provided that the logical flow and integrity of the process is not disrupted in substance.

In the example process, as depicted, at 602 the system scans for wireless network access point signaling. The signaling may be from a WiFi network, a Bluetooth network, a Zigbee network, an LTE network, or the like, or it may be some combination of at least two of these (or additional) types of wireless networks, according to various embodiments. In one type of embodiment, a mobile device is able to listen for signaling of all of the types of network communications that it supports. At 604, the scans are added to "bucket" segments. At 606, a decision is made as to whether the bucket is sufficiently large—e.g., whether the amount of scans in the bucket exceeds a defined threshold. In the negative case, the process loops back to operation 602 to continue scanning the environment for network access point signaling.

In the affirmative case, the process advances to iterative loop 608-610, where the scans in the current bucket are grouped in pair-wise fashion at 608, and their similarity is compared at 610. The result of these iterative grouping and comparison operations is a large, multi-dimensional data structure. Accordingly, at 612, the dimensionality of the result is reduced. Clustering operations are performed at 614 on the reduced-dimensionality set.

At 616-618, another iterative series of operations is performed for each determined cluster, which are traversed at 616. At 618, a decision is made regarding the cluster size. If the cluster size exceeds a defined threshold, the process advances to operation 620 in FIG. 6B. Otherwise, the process loops back to operation 604, where the scans are added to a new bucket.

In FIG. 6B, operations 620-622 iterate over each saved cluster (620) to compute inter-cluster similarity at 622. A decision 624, if a defined similarity threshold is exceeded, then the current cluster in question is added to the appropriate set of saved clusters. In the negative scenario, assuming the clusters are not sufficiently similar, the process advances to 628, where the clusters are stored for future use. Each cluster may be named by a user in the user annotation process.

Additional Notes & Examples

Example 1 is a system for locating a mobile device, the system comprising a computing platform to implement: an input module to access a plurality of scans of wireless network access signaling, the scans indicating received signal measurement results; a similarity measure module to compute comparisons between the data of different scans in order to assess the similarity between those scans, wherein the comparisons produce multi-dimensional comparison results; a dimension reduction module to reduce dimensionality of the multi-dimensional comparison results to produce a dimension-reduced set of comparison results; and a clustering module to identify groupings of similar scans based on the dimension-reduced set of comparison results.

In Example 2, the subject matter of Example 1 optionally includes an Input data filter module to test if a circumstance surrounding the scan renders the scan unsuitable for further processing as an indicator of location of the mobile device.

In Example 3, the subject matter of Example 2 optionally includes wherein the circumstance that renders the scan unsuitable includes a motion indicator being indicative of motion of the mobile device.

In Example 4, the subject matter of any one or more of Examples 2-3 optionally include wherein the circumstance that renders the scan unsuitable includes a prior location classification of a prior scan having assessed similarity to the scan.

In Example 5, the subject matter of any one or more of Examples 1-4 optionally include a disjoint location detector module to recognize a circumstance where the mobile device is in an entirely different location.

In Example 6, the subject matter of any one or more of Examples 1-5 optionally include a data bucket module to apply a quantity threshold representing a target quantity of collected scans to be subject to clustering by the clustering module.

In Example 7, the subject matter of any one or more of Examples 1-6 optionally include a cluster merge module to apply an inter-cluster similarity measure and, in response to the inter-cluster similarity measure exceeding a threshold, to merge the clusters based on measured inter-cluster similarity.

In Example 8, the subject matter of any one or more of Examples 1-7 optionally include wherein the similarity measure module applies Euclidian distance assessments of pairs of scans.

In Example 9, the subject matter of any one or more of Examples 1-8 optionally include wherein the system is incorporated in the mobile device.

In Example 10, the subject matter of any one or more of Examples 1-9 optionally include a user annotation module to facilitate a user interface responsive to commands of a user to annotate the groupings of similar scans according to a physical location to be associated with each of the groupings.

Example 11 is a machine-implemented method for locating a mobile device, the method comprising: accessing a plurality of scans of wireless network access signaling, the scans indicating received signal measurement results; computing comparisons between the data of different scans in order to assess similarity between those scans, wherein the comparisons produce multi-dimensional comparison results; reducing dimensionality of the multi-dimensional comparison results to produce a dimension-reduced set of comparison results; and identifying groupings of similar scans based on the dimension-reduced set of comparison results.

In Example 12, the subject matter of Example 11 optionally includes computationally testing whether a circumstance surrounding the scan renders the scan unsuitable for further processing as an indicator of location of the mobile device.

In Example 13, the subject matter of Example 12 optionally includes determining the scan to be unsuitable in response to a motion indicator being indicative of motion of the mobile device.

In Example 14, the subject matter of any one or more of Examples 12-13 optionally include determining the scan to be unsuitable in response to a presence of a prior location classification of a prior scan having an assessed similarity to the scan.

In Example 15, the subject matter of any one or more of Examples 11-14 optionally include detecting a circumstance where the mobile device is in an entirely different location.

In Example 16, the subject matter of any one or more of Examples 11-15 optionally include applying a quantity threshold representing a target quantity of collected scans to be subject to clustering.

In Example 17, the subject matter of any one or more of Examples 11-16 optionally include applying an inter-cluster similarity measure and, in response to the inter-cluster similarity measure exceeding a threshold, merging the clusters based on measured inter-cluster similarity.

In Example 18, the subject matter of any one or more of Examples 11-17 optionally include wherein computing the comparisons between the data of different scans includes applying Euclidian distance assessments of pairs of scans.

In Example 19, the subject matter of any one or more of Examples 11-18 optionally include providing a user interface responsive to commands of a user to annotate the groupings of similar scans according to a physical location to be associated with each of the groupings.

Example 20 is a system for locating a mobile device, the system comprising: means for accessing a plurality of scans of wireless network access signaling, the scans indicating received signal measurement results; means for computing comparisons between the data of different scans in order to assess similarity between those scans, wherein the comparisons produce multi-dimensional comparison results; means for reducing dimensionality of the multi-dimensional comparison results to produce a dimension-reduced set of comparison results; and means for identifying groupings of similar scans based on the dimension-reduced set of comparison results.

In Example 21, the subject matter of Example 20 optionally includes means for computationally testing whether a circumstance surrounding the scan renders the scan unsuitable for further processing as an indicator of location of the mobile device.

In Example 22, the subject matter of Example 21 optionally includes means for determining the scan to be unsuitable in response to a motion indicator being indicative of motion of the mobile device.

In Example 23, the subject matter of any one or more of Examples 21-22 optionally include means for determining the scan to be unsuitable in response to a presence of a prior location classification of a prior scan having an assessed similarity to the scan.

In Example 24, the subject matter of any one or more of Examples 20-23 optionally include means for detecting a circumstance where the mobile device is in an entirely different location.

In Example 25, the subject matter of any one or more of Examples 20-24 optionally include means for applying a quantity threshold representing a target quantity of collected scans to be subject to clustering.

In Example 26, the subject matter of any one or more of Examples 20-25 optionally include means for applying an inter-cluster similarity measure and, in response to the inter-cluster similarity measure exceeding a threshold, merging the clusters based on measured inter-cluster similarity.

In Example 27, the subject matter of any one or more of Examples 20-26 optionally include wherein the means for computing the comparisons between the data of different scans include means for applying Euclidian distance assessments of pairs of scans.

In Example 28, the subject matter of any one or more of Examples 20-27 optionally include means for providing a user interface responsive to commands of a user to annotate the groupings of similar scans according to a physical location to be associated with each of the groupings.

Example 29 is a system for locating a mobile device, the system comprising: means for carrying out the method according to any one of Examples 11-19.

Example 30 is at least one computer-readable medium containing instructions that, when executed by a computing platform, cause the computing platform to carry out the method according to any one of Examples 11-19.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for locating a mobile device, the system comprising a computing platform to implement:
   an input module to access a plurality of scans of wireless network access signaling, the scans indicating received signal measurement results;
   a similarity measure module to compute comparisons between the data of different scans in order to assess the similarity between those scans, wherein the comparisons produce multi-dimensional comparison results;
   a dimension reduction module to map the multi-dimensional comparison results to a lower-dimensional space to reduce dimensionality while maintaining similarity properties of the multi-dimensional comparison results, the similarity properties including at least one of distances, variation, or structure, to thereby produce a dimension-reduced set of comparison results; and
   a clustering module to identify groupings of similar scans based on the dimension-reduced set of comparison results.

2. The system of claim 1, further comprising:
   an input data filter module to test if a circumstance surrounding the scan renders the scan unsuitable for further processing as an indicator of location of the mobile device.

3. The system of claim 2, wherein the circumstance that renders the scan unsuitable includes a motion indicator being indicative of motion of the mobile device.

4. The system of claim 2, wherein the circumstance that renders the scan unsuitable includes a prior location classification of a prior scan having assessed similarity to the scan.

5. The system of claim 1, further comprising:
   a disjoint location detector module to recognize a circumstance where the mobile device is in an entirely different location.

6. The system of claim 1, further comprising:
   a data bucket module to apply a quantity threshold representing a target quantity of collected scans to be subject to clustering by the clustering module.

7. The system of claim 1, further comprising:
   a cluster merge module to apply an inter-cluster similarity measure and, in response to the inter-cluster similarity measure exceeding a threshold, to merge the clusters based on measured inter-cluster similarity.

8. The system of claim 1, wherein the similarity measure module applies Euclidian distance assessments of pairs of scans.

9. The system of claim 1, wherein the system is incorporated in the mobile device.

10. The system of claim 1, further comprising:
    a user annotation module to facilitate a user interface responsive to commands of a user to annotate the groupings of similar scans according to a physical location to be associated with each of the groupings.

11. A machine-implemented method for locating a mobile device, the method comprising:
    accessing a plurality of scans of wireless network access signaling, the scans indicating received signal measurement results;
    computing comparisons between the data of different scans in order to assess similarity between those scans, wherein the comparisons produce multi-dimensional comparison results;
    reducing dimensionality while maintaining similarity properties of the multi-dimensional comparison results, the similarity properties including at least one of distances, variation, or structure, including mapping the multi-dimensional comparison results to a lower-dimensional space, to produce a dimension-reduced set of comparison results; and
    identifying groupings of similar scans based on the dimension-reduced set of comparison results.

12. The method of claim 11, further comprising:
    computationally testing whether a circumstance surrounding the scan renders the scan unsuitable for further processing as an indicator of location of the mobile device.

13. The method of claim 11, further comprising:
    applying a quantity threshold representing a target quantity of collected scans to be subject to clustering.

14. The method of claim 11, further comprising:
    applying an inter-cluster similarity measure and, in response to the inter-cluster similarity measure exceeding a threshold, merging the clusters based on measured inter-cluster similarity.

15. The method of claim 11, wherein computing the comparisons between the data of different scans includes applying Euclidian distance assessments of pairs of scans.

16. The method of claim 11, further comprising:
    providing a user interface responsive to commands of a user to annotate the groupings of similar scans according to a physical location to be associated with each of the groupings.

17. At least one non-transitory computer-readable medium containing instructions that, when executed on a computing platform, cause the computing platform to execute operations comprising:
    accessing a plurality of scans of wireless network access signaling, the scans indicating received signal measurement results;
    computing comparisons between the data of different scans in order to assess similarity between those scans, wherein the comparisons produce multi-dimensional comparison results;
    reducing dimensionality while maintaining similarity properties of the multi-dimensional comparison results, the similarity properties including at least one of distances, variation, or structure, including mapping the multi-dimensional comparison results to a lower-dimensional space, to produce a dimension-reduced set of comparison results; and
    identifying groupings of similar scans based on the dimension-reduced set of comparison results.

18. The at least one computer-readable medium of claim 17, further comprising:
    instructions for computationally testing whether a circumstance surrounding the scan renders the scan unsuitable for further processing as an indicator of location of the mobile device.

19. The at least one computer-readable medium of claim 18, further comprising:
   instructions for determining the scan to be unsuitable in response to a motion indicator being indicative of motion of the mobile device.

20. The at least one computer-readable medium of claim 18, further comprising:
   instructions for determining the scan to be unsuitable in response to a presence of a prior location classification of a prior scan having an assessed similarity to the scan.

21. The at least one computer-readable medium of claim 17, further comprising:
   instructions for detecting a circumstance where the mobile device is in an entirely different location.

22. The at least one computer-readable medium of claim 17, further comprising:
   instructions for applying a quantity threshold representing a target quantity of collected scans to be subject to clustering.

23. The at least one computer-readable medium of claim 17, further comprising:
   instructions for applying an inter-cluster similarity measure and, in response to the inter-cluster similarity measure exceeding a threshold, merging the clusters based on measured inter-cluster similarity.

24. The at least one computer-readable medium of claim 17, wherein the instructions for computing the comparisons between the data of different scans include instructions for applying Euclidian distance assessments of pairs of scans.

25. The at least one computer-readable medium of claim 17, further comprising:
   instructions for providing a user interface responsive to commands of a user to annotate the groupings of similar scans according to a physical location to be associated with each of the groupings.

* * * * *